(12) United States Patent
Kamo

(10) Patent No.: US 10,558,106 B2
(45) Date of Patent: Feb. 11, 2020

(54) STOP APPARATUS, LENS APPARATUS USING SAME, AND IMAGE PICKUP APPARATUS

(71) Applicant: CANON KABUSHIKI KAISHA, Tokyo (JP)

(72) Inventor: Daichi Kamo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 15/699,130

(22) Filed: Sep. 8, 2017

(65) Prior Publication Data

US 2018/0088442 A1 Mar. 29, 2018

(30) Foreign Application Priority Data

Sep. 29, 2016 (JP) .................................. 2016-191613

(51) Int. Cl.
*G03B 9/06* (2006.01)
(52) U.S. Cl.
CPC ....................................... *G03B 9/06* (2013.01)
(58) Field of Classification Search
CPC .......................................................... G03B 9/06
See application file for complete search history.

(56) References Cited

U.S. PATENT DOCUMENTS

2006/0033974 A1* 2/2006 Sato .................... G03B 9/06
359/227
2016/0209725 A1 7/2016 Kamo

FOREIGN PATENT DOCUMENTS

| JP | 2001033844 A | 2/2001 |
| JP | 2009162924 A | 7/2009 |
| JP | 2012123299 A | 6/2012 |
| JP | 2013029693 A | 2/2013 |

* cited by examiner

*Primary Examiner* — Minh Q Phan
(74) *Attorney, Agent, or Firm* — Rossi, Kimms & McDowell LLP

(57) ABSTRACT

A stop apparatus including stop blades; a supporting member supporting stop blades rotatably about rotating centers; and a rotating member rotating the stop blades, one of the stop blades or the rotating members, having protruded parts, and the other having recessed parts engaging with the protruded parts, the stop blades including: close blades forming close state by rotating in a direction of closing an opening both during stopping down the opening from open state to predetermined opening diameter state and during stopping down the opening from the predetermined opening diameter state to the close state; and non-close blades rotating in the direction of closing the opening during stopping down the opening from the open state to the predetermined opening diameter state and rotating in a direction of opening the opening during stopping down the opening from the open state from the predetermined opening diameter state to the close state.

19 Claims, 10 Drawing Sheets

STOP APPARATUS, LENS APPARATUS USING SAME, AND IMAGE PICKUP APPARATUS

BACKGROUND OF THE INVENTION

Field of the Invention

The present invention generally relates to a stop apparatus used in a lens apparatus for capturing images, and more particularly to the stop apparatus with a stop opening diameter being varied by a rotating operation, the lens apparatus including the stop apparatus, and an image pickup apparatus.

Description of the Related Art

There has hitherto been known a stop apparatus configured such that a plurality of stop blades equipped with rotating spindles is disposed at an equal angular interval on a same circumference, and a stop opening formed by superposing inner edge portions of the stop blades is varied by rotating the stop blades through rotations of the stop blades about the rotating spindles. This type of stop apparatus has a general structure that the stop blades are equipped with rotating center pins and drive pins, and cam grooves formed in a cam plate taking a disc-like shape guide positions of the drive pins with respect to the rotating center pins supported in fixing positions.

A stop opening shape has influence on a quality of blurs peripheral to a main subject of a captured image, and a more beautiful blurred image can be obtained as a stop opening shape becomes more approximate to a circle. A means for getting the stop opening shape approximate to the circle generally involves using a method of increasing a number of stop blades.

However, when increasing the number of stop blades in this type of stop apparatus, the stop blades become tighter in superposition on each other as an opening diameter is made smaller, resulting in a problem of augmenting a resistance against opening/closing operations of the blades. In particular, the resistance produced by the superposition of the blades on each other, further continues tilting the blades after stopping down an opening to a minimum stop diameter in design from an open side, and rises at the maximum when setting a close state to completely close the opening. As described above, driving in a state of an increased slide resistance due to the tight superposition has an apprehension of causing damages to the blades and malfunctions in movements of the blades.

As a solution of such a problem, Japanese Patent Application Laid-Open No. 2012-123299 has a contrivance of preparing plural sets of blades forming different opening diameters, decreasing a number of superposed blades by switching over the set of blades used in an area with a large opening diameter and the set of blades used in an area with a small opening diameter, and thus reducing the resistance. This method, however, entails mounting the stop apparatus with the plural sets of multiple blades. Additionally, such an apprehension exists that the multiple blades mounted in the stop apparatus are disabled from being simultaneously utilized for forming opening shapes.

Japanese Patent Application Laid-Open No. 2009-162924 has a contrivance of controlling a flexure direction and a flexure quantity of the stop blades when stopping down the opening by previously bending the stop blades, and thus restraining a friction caused between the superposed blades.

However, the previously bent blades are high in degree of difficulty for working and management, and have an apprehension of increasing costs for components.

SUMMARY OF THE INVENTION

To accomplish the object described above, a stop apparatus includes:

a plurality of stop blades;

a supporting member supporting the plurality of stop blades rotatably about rotating centers thereof; and a rotating member rotating the plurality of stop blades, one, of the plurality of stop blades or the rotating members, having protruded parts, and the other having recessed parts or holes engaging with the protruded parts, the plurality of stop blades including: close blades forming a close state by rotating in a direction of closing an opening of the stop apparatus both during stopping down the opening from an open state to a predetermined opening diameter state and during stopping down the opening from the predetermined opening diameter state to the close state when stopping down from the open state to the close state; and non-close blades rotating in the direction of closing the opening during stopping down the opening from the open state to the predetermined opening diameter state and rotating in a direction of opening the opening during stopping down the opening from the open state from the predetermined opening diameter state to the close state when stopping down from the open state to the close state.

According to the present invention, it is feasible to provide the stop apparatus configured to form a stop opening shape approximate to a circle by a multiplicity of stop blades and to reduce loads on the blades when closed without changing a present configuration and increasing a number of components.

Further features of the present invention will become apparent from the following description of exemplary embodiments with reference to the attached drawings.

DESCRIPTION OF THE EMBODIMENTS

A preferred embodiment of the present invention will now be described in detail, based on Embodiments illustrated in FIGS. 1 to 8.

Embodiment

Figure 1:
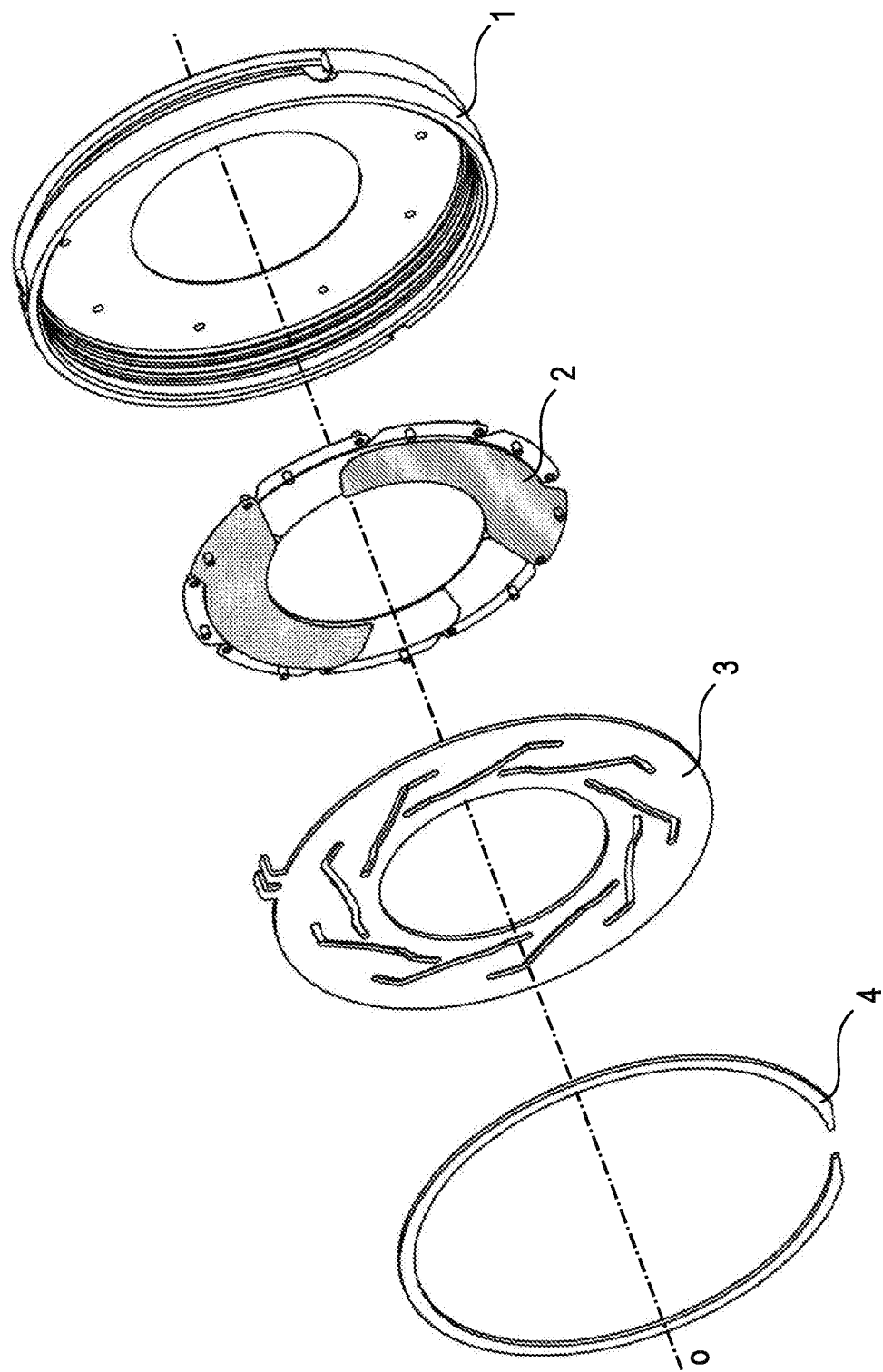
FIG. 1 is an exploded perspective view of a stop mechanism in an Embodiment of the present invention.

FIG. 1 illustrates an exploded perspective view of the present Embodiment. A stop apparatus is configured to include, as illustrated in FIG. 1, a stop blade support sleeve (supporting member) 1, a plurality of stop blades 2, a cam disc (rotating member) 3, and a pressing washer 4, in which a symbol "o" represents a position of an optical axis. The optical axis is a term connoting the optical axis of the lens apparatus which the stop apparatus is mounted in and fixed to. The stop apparatus is mounted in the lens apparatus, in which case a center of an opening formed by the stop blades is coincident with the optical axis of the mounting target lens apparatus. Accordingly, the description of the present specification is to deal with the position of the optical axis to have a same meaning as a position of the center of the opening formed by the stop blades and as a position of a rotating center of the cam disc.

Figure 2:
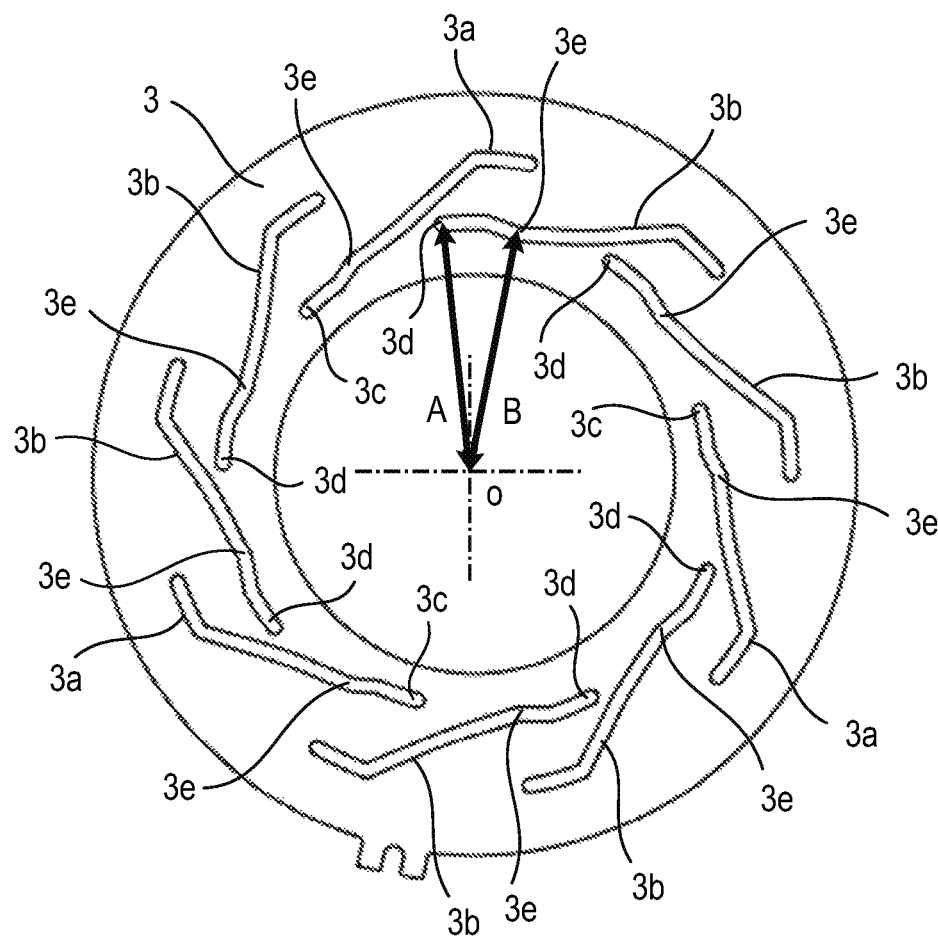
FIG. 2 is a view of a cam disc in the Embodiment of the present invention.

The cam disc 3 includes, as depicted in FIG. 2, three lines of first cam grooves 3a, and six lines of second cam grooves 3b. The first cam grooves 3a and the second cam grooves 3b take same shapes up to points 3e on the cam to attain a minimum stop opening diameter in design by continuously stopping down the stop apparatus from an open opening state. The first cam grooves 3a take such a cam-shape that the stop blades with drive pins engaging with the cam close a center of the stop opening diameter after attaining the minimum stop opening diameter in design, and are also called close cams (close cam shapes) 3a. On the other hand, the second cam grooves 3b take such a cam-shape that the stop blades with the drive pins engaging with the cam are driven in a direction of reopening the stop opening within a range that does not cause a light leakage after attaining the minimum stop opening diameter in design, and are also called non-close cams (non-close cam shapes) 3b. To be specific, a distance A from the optical-axis position "o" of inside-diameter side endpoints (close side endpoints) 3d of the non-close cams 3b is larger than a distance B from the optical-axis position "o" of such points 3e on the cams that the stop blades with the drive pins engaging with the cam grooves 3a, 3b attain the minimum stop opening diameter in design.

Figure 3:
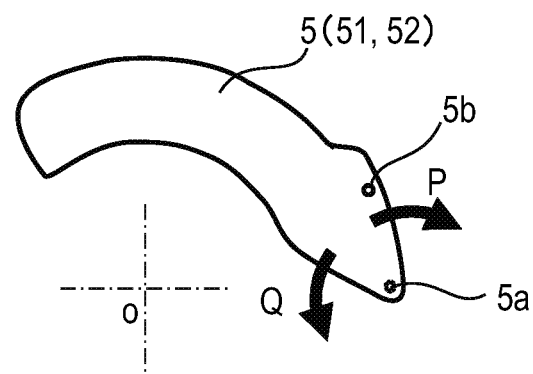
FIG. 3 is a view of a stop blade as viewed from a side of a drive pin in the Embodiment of the present invention.
Figure 4:
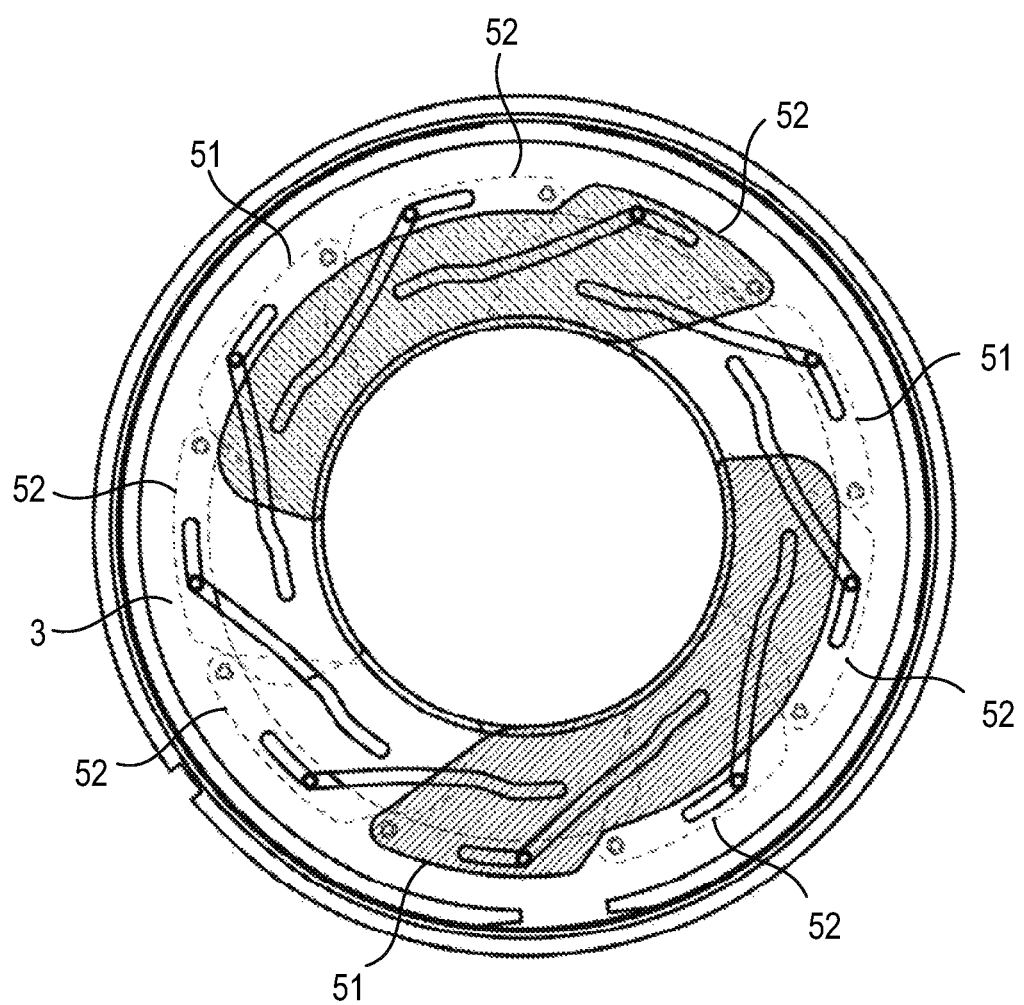
FIG. 4 is a view of a stop open state of the stop mechanism in the Embodiment of the present invention.
Figure 5:
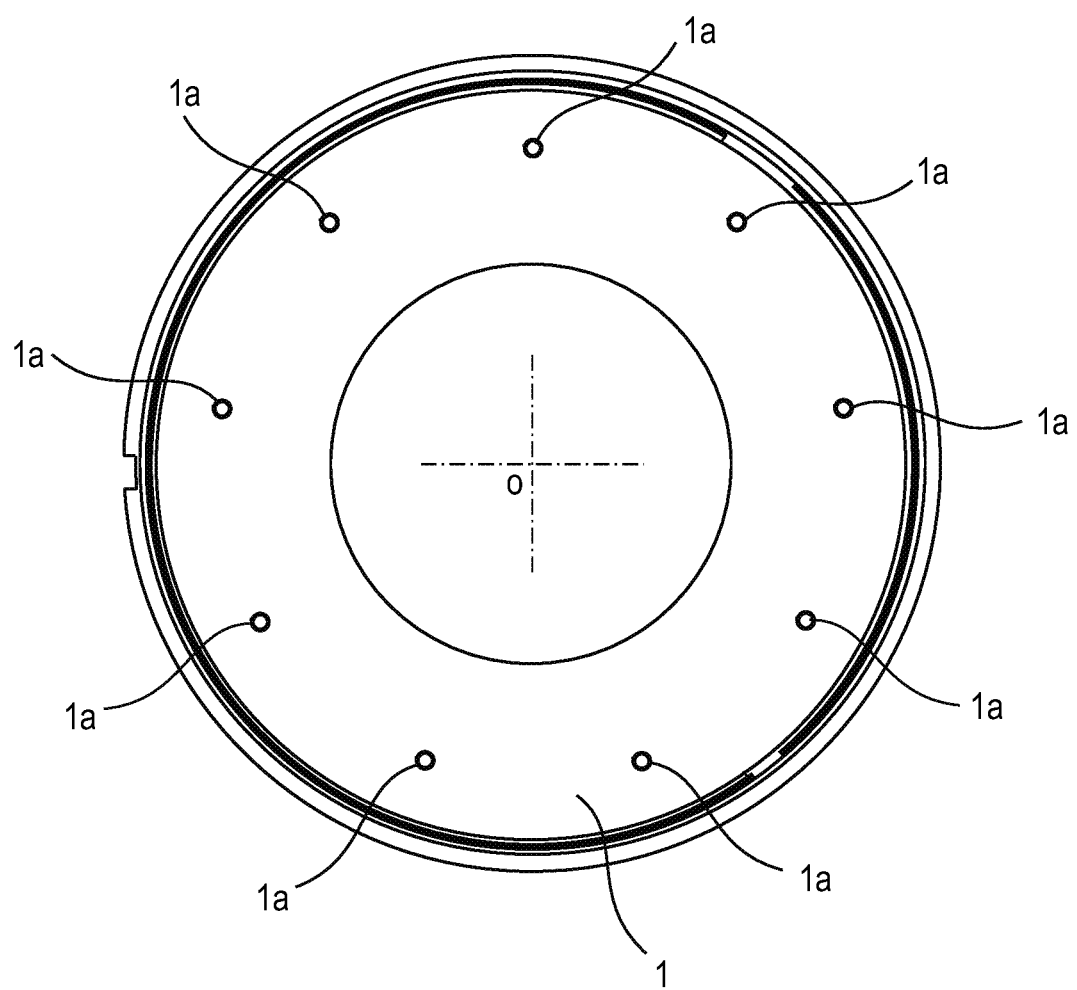
FIG. 5 is a view of a blade support sleeve (supporting member) in the Embodiment of the present invention.

Each of the stop blades 5 is, as illustrated in FIG. 3, provided with a rotating center pin (rotating center member) 5a protruded on a surface on one side, and with a drive pin 5b protruded on a surface on an opposite side. FIG. 4 is a view of a stop mechanism kept in the stop open state according to the present Embodiment. The plurality of stop blades 2 is configured to include, as depicted in FIG. 4, two types of blades called close blades and non-close blades 52, depending on types of cams engaged with the drive pins of the stop blades 5. Herein, the close blades 51 represent the blades in such a state that the drive pins 5b of the stop blades 5 engage with the close cams 3a, while the non-close blades 52 represent the blades in such a state that the drive pins 5b of the stop blades 5 engage with the non-close cams 3b.

Figure 6:
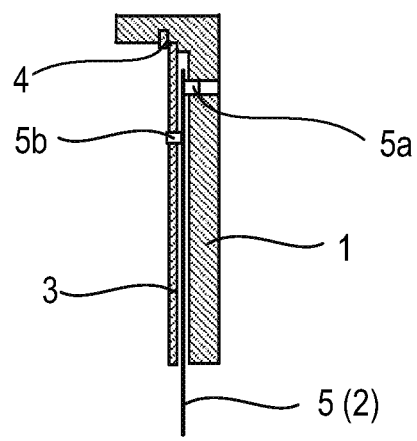
FIG. 6 is a schematic vertical sectional view of the stop mechanism in the Embodiment of the present invention.
Figure 6:
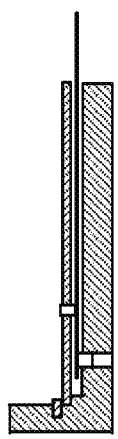

The plurality of stop blades 2 according to the present Embodiment is configured to include the three close blades 51 and the six non-close blades 52, in which the rotating center pins 5a engage with engagement holes (recessed portions) 1a (see FIG. 5) formed in the stop blade support sleeve 1. The present Embodiment has the configuration that the stop blades 5 are provided with the protruded rotating center pins, which engage with the engagement holes 1a of the stop blade support sleeve 1, but the present invention is not limited to this configuration. It is also feasible to acquire a same effect from such a configuration that the rotating center pins are provided on the stop blade support sleeve 1 and engage with the rotating center holes formed in the stop blades. On the side of the drive pins 5b of the plurality of stop blades 2, the cam disc 3 is provided rotatably with respect to the stop blade support sleeve 1 about the optical-axis position "o". As illustrated in FIG. 6, the plurality of stop blades 2 is interposed between the cam disc 3 and the stop blade support sleeve 1.

Figure 7:
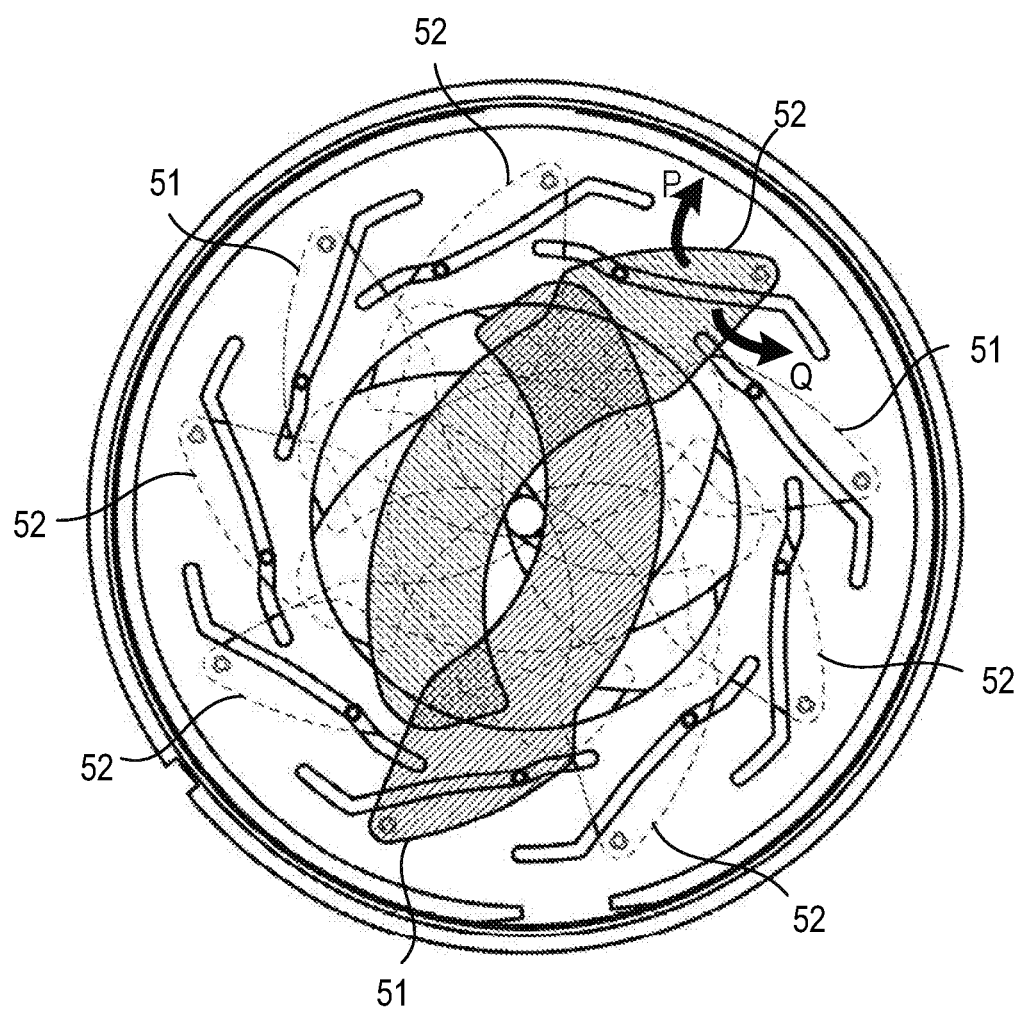
FIG. 7 is a view of a minimum stop state in design by the stop mechanism in the Embodiment of the present invention.
Figure 8:
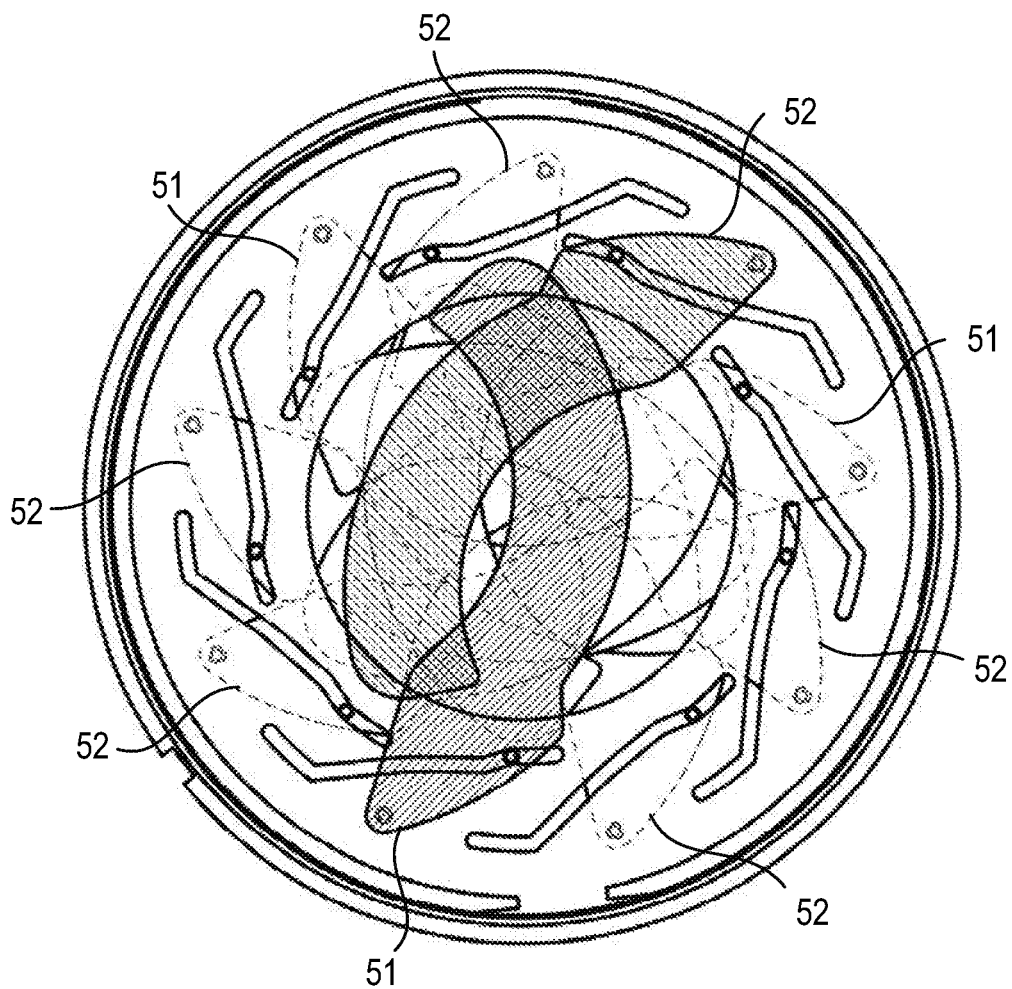
FIG. 8 is a view of a close state by the stop mechanism in the Embodiment of the present invention.

With the structure described above, when the cam disc 3 is rotated about the optical-axis position "o" with respect to the stop blade support sleeve 1, the drive pins 5b of the stop blades 5 are guided along the cam grooves 3a, 3b respectively. The stop blades 5 thus rotate about the rotating center pin 5a serving as a spindle. FIG. 7 is a view of a minimum stop state in design, of the stop mechanism according to an Embodiment 1, and FIG. 8 is a view of a close state thereof. Herein, as depicted in FIGS. 3 and 7, a rotating direction of the stop blades 5 includes two types of directions, i.e., a direction (second direction) P of opening the opening of the stop apparatus with the rotating center pin 5a serving as the spindle, and a direction (first direction) Q of closing the opening. The stop apparatus according to the present Embodiment is configured such that all the blades are driven stepwise through a same angle in the direction Q of closing the opening up to the minimum stop state in design from the open state in FIG. 4, thus forming the opening by all the blades. Then, during a transition to the close state in FIG. 8 from the minimum stop state in design in FIG. 7, the close blades 51 are driven in the direction Q of closing the opening, while the non-close blades 52 are driven in the direction P of opening the opening.

An iris diaphragm structured to superpose the blades as in the present Embodiment becomes tighter in superposition of the blades and larger in resistance against the blades as the stop opening diameter becomes smaller. Such being the case, in the present Embodiment, after forming the minimum stop, the mutual superposition of the blades is slackened by driving the non-close blades 52 not closing the center of the opening in the direction P of opening the opening within a range that does not cause the light leakage from the minimum stop state.

The stop apparatus according to the present Embodiment therefore has a stop opening shape approximate to a circle, which is based on the plurality of stop blades, by forming the opening in a way that uses all the blades till attaining the minimum stop opening diameter in design. Moreover, the two types of blades are driven in the different directions when transitioning to the close state, thereby enabling a reduction of the hitherto largest resistance against the blades upon the transition to the close state from the minimum stop state.

The present Embodiment, as illustrated in FIGS. 7 and 8, takes such a cam shape that when the close blades start being driven to the close state after forming the minimum stop in design, while the non-close blades are driven in the direction P of opening the opening diameter at substantially same timing, but is not limited to this cam shape. Such a cam shape may also be taken that the non-close blades keep substantially a same posture (the non-rotating state about the rotating center pin) and are driven in the direction P of opening the opening diameter after the close blade have started being driven to the close state. Alternatively, such a cam shape may also be taken that both of the close blades and the non-close blades keep substantially the same posture (the non-rotating state about the rotating center pin) during a predetermined period, and are thereafter driven in the directions different from each other. With the blades being thus driven, the non-close blades start again being driven in the direction P of opening the opening ahead of the close blades starting closing the opening due to a backlash of components or ahead of forming the minimum stop diameter, thereby enabling prevention of occurrence of inconvenience that the minimum stop diameter in design is not assured.

The Embodiment described above adopts the configuration that after attaining the minimum stop state in design, all the non-close blades rotate about the rotating center pins on the opening side when the close blades move toward the close state, but the present invention is not limited to this configuration. A configuration that at least one non-close blade rotates about the rotating center pin on the opening side, enables effects of the present invention to be enjoyed. In other words, the configuration that at least one non-close cam is formed so that a distance from the center (optical-axis position) of the opening increases toward the inside-diameter side endpoint from the minimum stop state in design, enables the effects of the present invention to be enjoyed.

It is generally deemed preferable that the individual stop blade is designed small in order to decrease in size and in weight the stop apparatus and the lens apparatus incorporating the stop apparatus and to reduce a slide resistance between the stop blades. The stop blade is therefore designed to diminish a portion protruded outward in a diametrical direction when opened, to decrease an area as viewed from the optical-axis direction, and to make compact a diameter-directional size about the optical axis.

Figure 9:
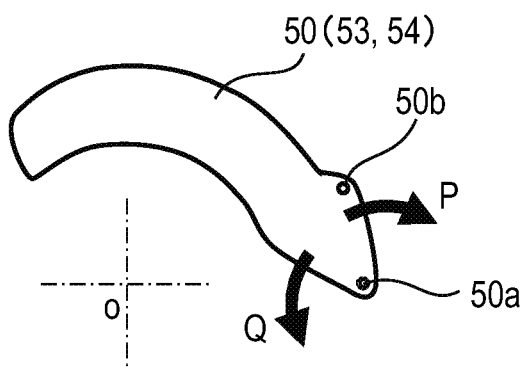
FIG. 9 is a view of a small-size stop blade as viewed from the side of the drive pin in the Embodiment of the present invention.

FIG. 9 illustrates a small-size stop blade 50 designed to decrease the area as viewed from the optical-axis direction. The stop blade 50 is, as depicted in FIG. 9, provided with a rotating center pin (rotating center member) 50a protruded on a surface on one side, and with a drive pin 50b protruded on a surface on an opposite side.

Figure 10:
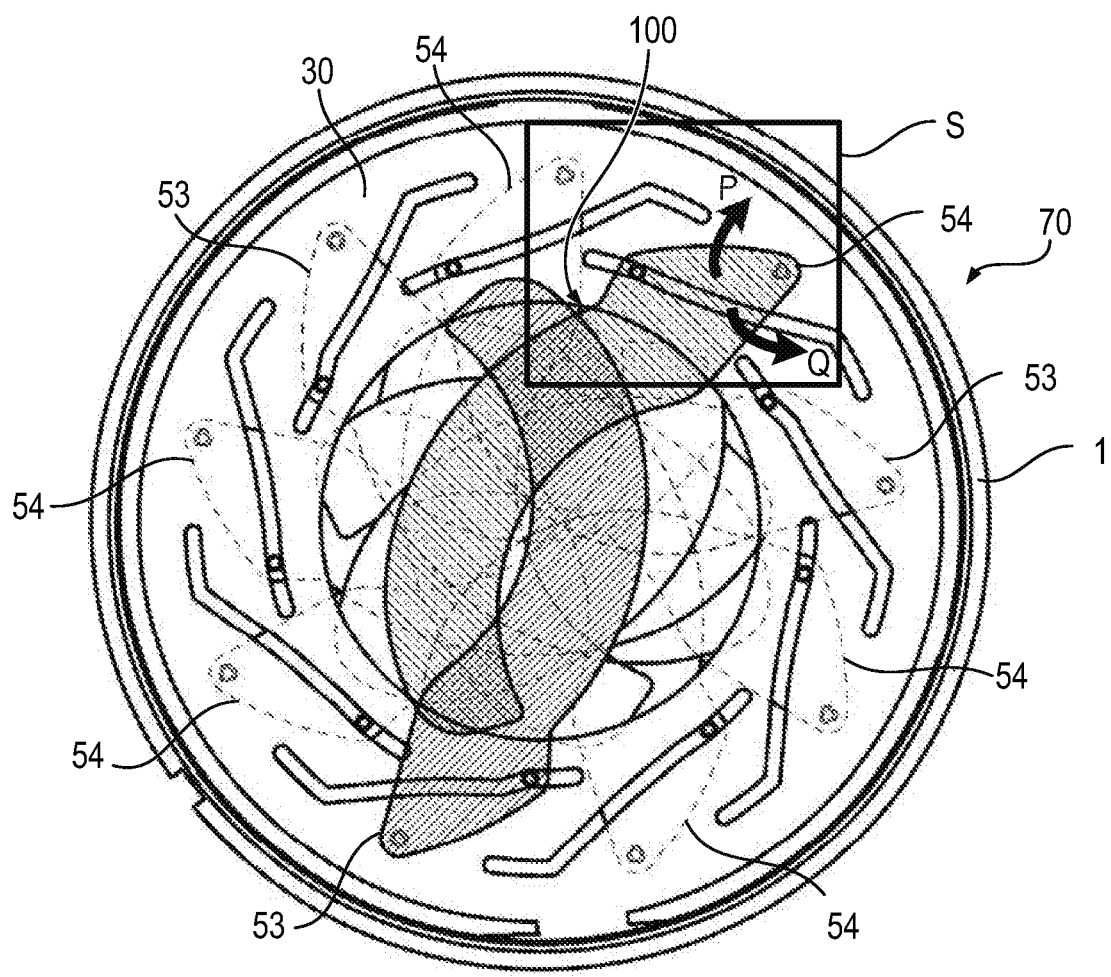
FIG. 10 is a view of the close state of the stop mechanism in a reference embodiment.
Figure 11:
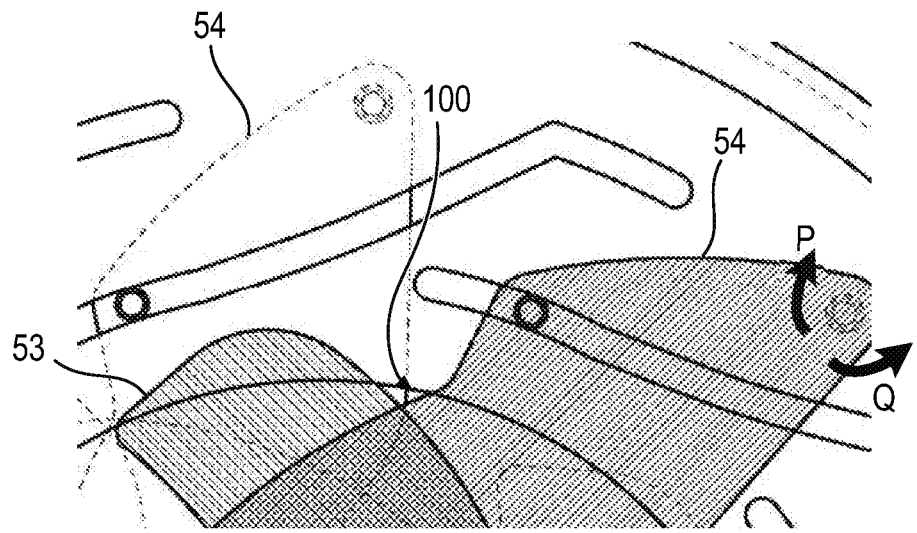
FIG. 11 is a partially enlarged view of the close state of the stop mechanism in the reference embodiment.

FIG. 10 is a view of a stop apparatus 70 mounted with the small-size stop blades 50, and FIG. 11 is an enlarged view of a portion within a frame S of FIG. 10. Herein, the small-size stop blades 50 are configured to include two types of blades called small-size close blades 53 and small-size non-close blades 54, depending on types of cams engaged with drive pins 50b.

Figure 12:
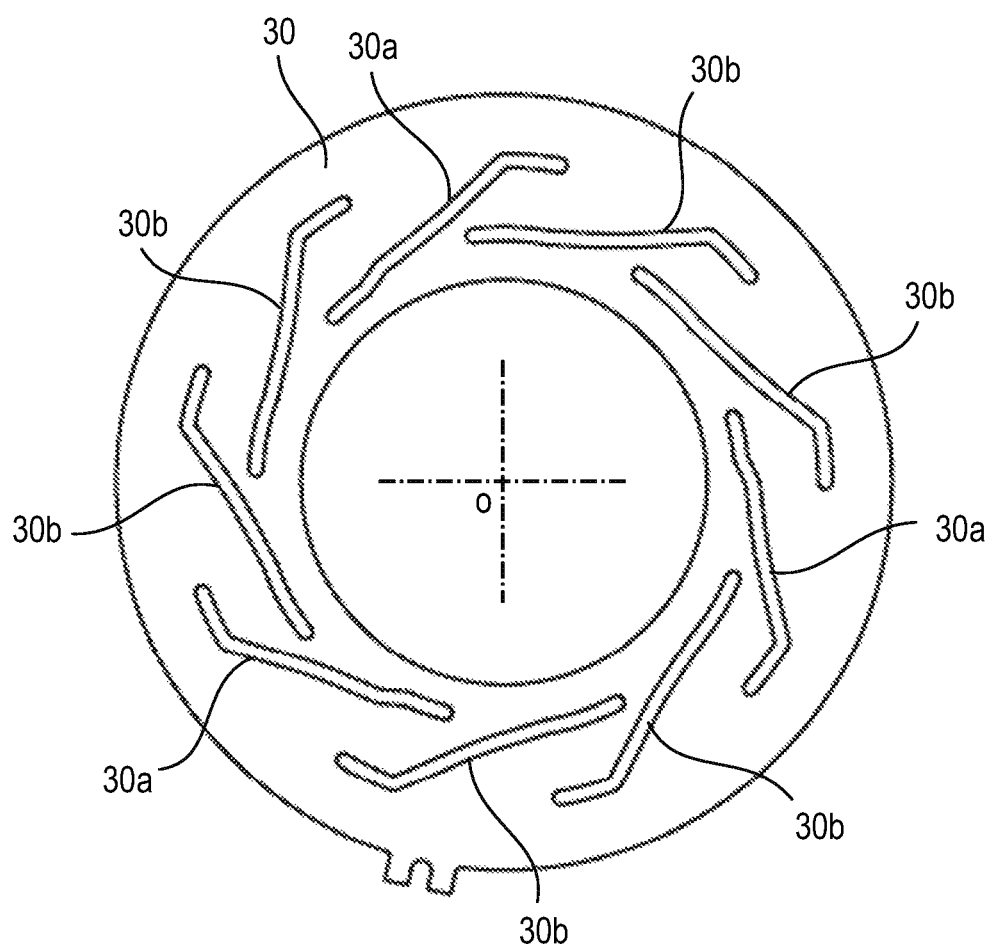
FIG. 12 is a view of the cam disc in the reference embodiment.

FIG. 12 illustrates a cam disc 30 mounted in the stop apparatus 70, in which the drive pins 50b of the small-size close blades 53 and the small-size non-close blades 54 engage with close cams 30a and non-close cams 30b, respectively. Rotating center pins 50a of the small-size stop blades 50 engage with the engagement holes 1a of the stop blade support sleeve 1, respectively. The cam disc 3 is different from the cam disc 31 in terms of only a shape of the non-close cam 31b. The stop apparatus 70 drives the blades of a general type of stop apparatus such as attaining the close state, while the small-size non-close blades 54 keep the same posture after attaining the minimum stop diameter in design.

Hence, the non-close cams 30b takes such a cam shape as to attain the close state, while the small-size non-close blades 54 keep the same posture, after the stop apparatus has attained the minimum stop diameter in design.

Herein, as illustrated in FIGS. 10 and 11, when the stop blades are designed excessively small, a gap 100 is formed among the stop blade support sleeve 1, the cam disc 30 and the stop blade or between the stop blades upon reaching the close state by driving only the small-size close blades 53, resulting in an apprehension of not fulfilling an original function due to occurrence of the light leakage. Consequently, in the conventional stop apparatus, the shape of the stop blade needs being designed large to some extent in order not to cause the light leakage due to the gap being formed even when set in the close state.

Figure 13:
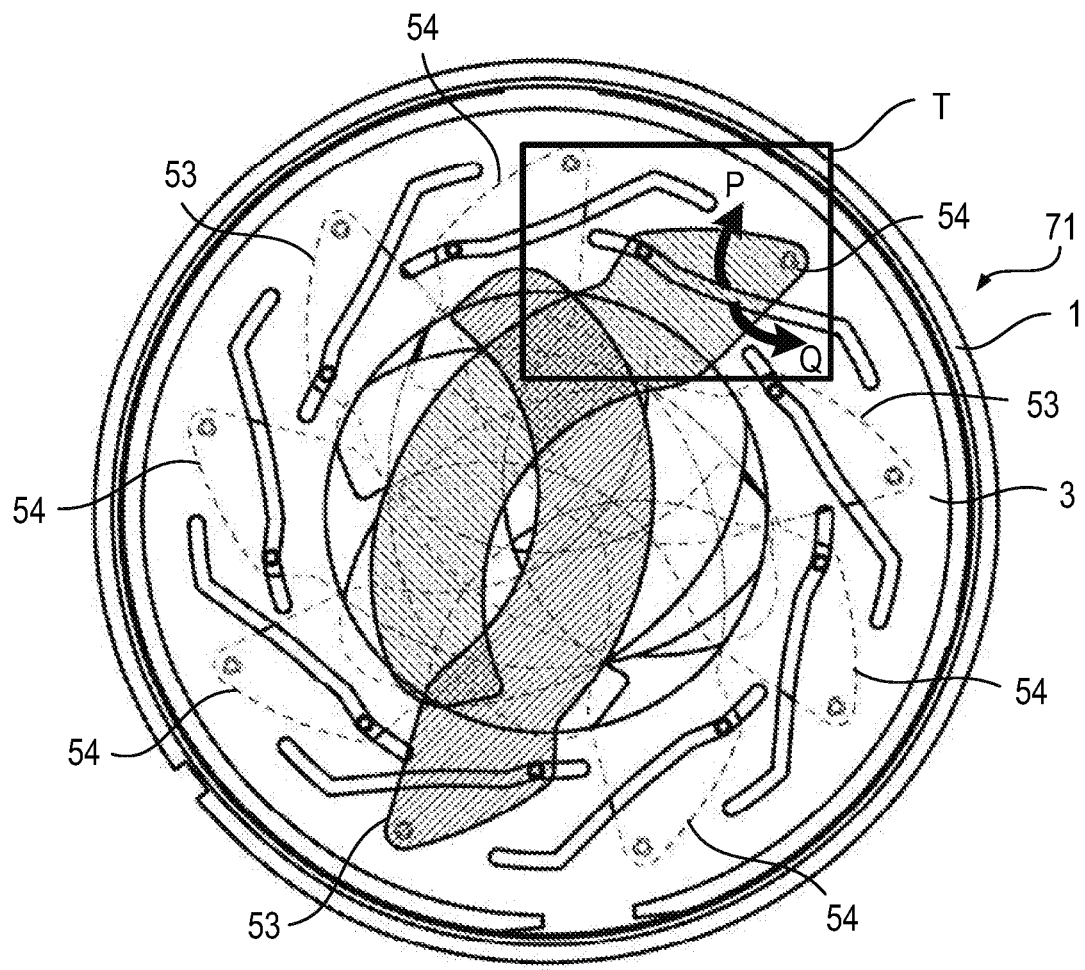
FIG. 13 is a view of the close state of the stop mechanism mounted with the small-size stop blades in the Embodiment of the present invention.
Figure 14:
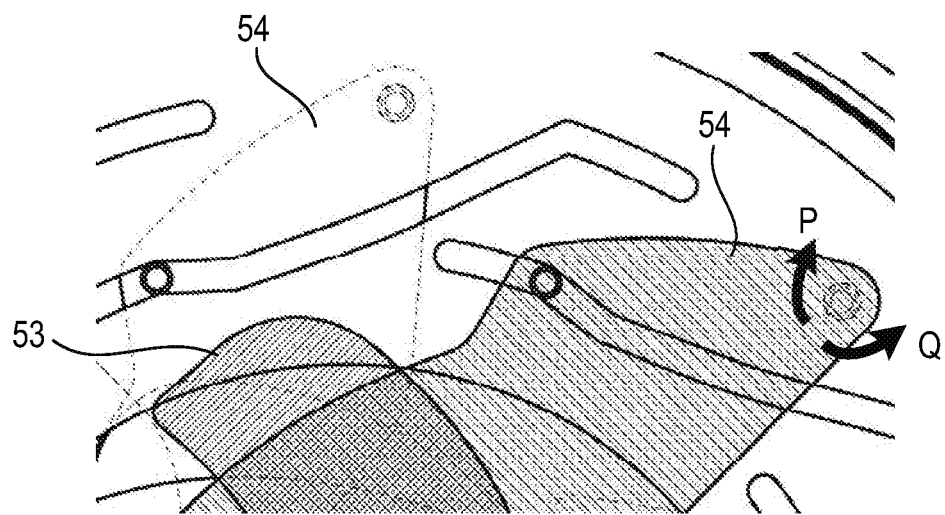
FIG. 14 is a partially enlarged view of the close state of the stop mechanism mounted with the small-size stop blades in the Embodiment of the present invention.

FIG. 13 is a view of a stop apparatus 71 according to the present invention when mounted with the small-size stop blades 50, and FIG. 14 is an enlarged view of a portion within a frame T of FIG. 13. In this stop apparatus also, the small-size stop blades 50 are configured to include two types of blades called the small-size close blades 53 and the small-size non-close blades 54, depending on the types of the cams engaged with drive pins 50b. The drive pins 50b of the small-size close blades 53 and the small-size non-close blades 54 engage with the close cams 3a and the non-close cams 3b, respectively. The rotating center pins 50a of the small-size close blades 53 and the small-size non-close blades 54 engage with the engagement holes 1a of the stop blade support sleeve 1, respectively. In the stop apparatus 71 according to the present invention, the driving to the closet state from the minimum stop state involves moving the small-size close blades 53 in the close direction Q by the close cams 3a, and moving the small-size non-close blades 54 in the opening direction P by the non-close cams 3b. With these movements, in the stop apparatus 71, the small-size non-close blades 54 cover the gap 100 formed hitherto in the stop apparatus 70 after the small-size close blades 53 have moved to attain the close state, thereby enabling the light leakage to be prevented. As discussed above, when the configuration of the present invention is carried out, it is feasible to effectively utilize the area of the individual stop blade and also to design the stop blade smaller than hitherto.

The lens apparatus enabled to enjoy the operational effects of the stop apparatus according to the present invention can be actually attained by configuring the lens apparatus equipped with the stop apparatus according to the Embodiment described above.

The image pickup apparatus is configured to include: the lens apparatus equipped with the stop apparatus according to the Embodiment described above; and the camera apparatus connected to the lens apparatus, thereby enabling the image pickup apparatus to be actually attained, from which the operational effects of the stop apparatus according to the present invention are acquired.

The stop apparatus or the image pickup apparatus including this stop apparatus are configured as described above, whereby loads applied on the blades are released on the occasion of the minimum stop opening diameter (which is the minimum stop opening diameter in design and is also the minimum opening diameter when excluding the close state), and the close blades can be driven in the direction of closing the opening. Risks against damages to and malfunctions of the blades (especially the close blades) can be thereby further reduced.

The present Embodiment enables the close blade and the non-close blade to be configured in the same shape, whereby a number of components is restrained from increasing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-191613, filed Sep. 29, 2016, which is hereby incorporated by reference herein in its entirety.

What is claimed is:

1. A stop apparatus comprising:
a plurality of stop blades;
a supporting member supporting the plurality of stop blades rotatably about rotating centers thereof; and
a rotating member for rotating the plurality of stop blades,
the plurality of stop blades including:
a close blade which is rotated by the rotating member in a first direction both during the stop apparatus stopping down an opening of the stop apparatus from an open state to a predetermined opening diameter state and during the stop apparatus stopping down the opening from the predetermined opening diameter state to a close state; and
a non-close blade which is rotated by the rotating member in the first direction during the stop apparatus stopping down the opening from the open state to the predetermined opening diameter state and rotated by the rotating member in a second direction opposite to the first direction during the stop apparatus stopping down the opening from the predetermined opening diameter state to the close state.

2. The stop apparatus according to claim 1, wherein the rotating member is provided with a close cam engaged with a pin provided on the close blade, and a non-close cam engaged with a pin provided on the non-close blade, and
the non-close cam has such a shape that a distance from a center of a diameter of the opening to an endpoint of the non-close cam where the pin of the non-close blade is engaged with in the close state is longer than a distance from the center of the diameter of the opening to a point of the non-close cam where the pin of the non-close blade is engaged with in the predetermined opening diameter state.

3. The stop apparatus according to claim 1, wherein the stop apparatus constitutes an iris diaphragm.

4. The stop apparatus according to claim 1, wherein the stop blades include a plurality of the close blade.

5. The stop apparatus according to claim 4, wherein the stop blades include three of the close blade.

6. The stop apparatus according to claim 1, wherein an opening in the predetermined opening diameter state is formed by the close blade and the non-close blade.

7. The stop apparatus according to claim 1, wherein an opening diameter in the predetermined opening diameter state is a minimum opening diameter excluding an opening diameter in the close state.

8. The stop apparatus according to claim 1, wherein the non-close blade is rotated in the second direction after a state in which the non-close blade is not rotated while the close blade is rotated to stop down the opening toward the close state from the predetermined opening diameter state.

9. The stop apparatus according to claim 1, wherein the rotating centers are pins provided on the plurality of stop blades, and
the pins are engaged with recessed parts or holes formed in the supporting member.

10. The stop apparatus according to claim 1, wherein the rotating centers are recessed parts or holes formed in the plurality of stop blades, and
the recessed parts or the holes are engaged with pins provided on the supporting member.

11. A lens apparatus comprising:
a stop apparatus,
wherein the stop apparatus comprises:
a plurality of stop blades;
a supporting member supporting the plurality of stop blades rotatably about rotating centers thereof; and
a rotating member for rotating the plurality of stop blades,
the plurality of stop blades including:
a close blade which is rotated by the rotating member in a first direction both during the stop apparatus stopping down an opening of the stop apparatus from an open state to a predetermined opening diameter state and during the stop apparatus stopping down the opening from the predetermined opening diameter state to a close state; and
a non-close blade which is rotated by the rotating member in the first direction during the stop apparatus stopping down the opening from the open state to the predetermined opening diameter state and rotated by the rotating member in a second direction opposite to the first direction during the stop apparatus stopping down the opening from the predetermined opening diameter state to the close state.

12. An image pickup apparatus comprising:
a lens apparatus comprising a stop apparatus; and
a camera apparatus connected to the lens apparatus and including an image pickup element configured to receive light from the lens apparatus,
wherein the stop apparatus comprises:
a plurality of stop blades;
a supporting member supporting the plurality of stop blades rotatably about rotating centers thereof; and
a rotating member for rotating the plurality of stop blades,
the plurality of stop blades including:
a close blade which is rotated by the rotating member in a first direction both during the stop apparatus stopping down an opening of the stop apparatus from an open state to a predetermined opening diameter state and during the stop apparatus stopping down the opening from the predetermined opening diameter state to a close state; and
a non-close blade which is rotated by the rotating member in the first direction during the stop apparatus stopping down the opening from the open state to the predetermined opening diameter state and rotated by the rotating member in a second direction opposite to the first direction during the stop apparatus stopping down the opening from the predetermined opening diameter state to the close state.

13. A stop apparatus comprising:
a plurality of stop blades;
a supporting member supporting the plurality of stop blades rotatably about rotating centers thereof; and
a rotating member for rotating the plurality of stop blades,
the plurality of stop blades including a close blade and a non-close blade which are rotated by the rotating member in a same direction within a rotating range till forming a predetermined opening diameter state of an opening of the stop apparatus from an open state of the opening, but are rotated by the rotating member in directions different from each other within a rotating range till forming a close state of the opening from the predetermined opening diameter state, the close blade thus forming the close state.

14. A lens apparatus comprising:
a stop apparatus defined in claim 13.

15. An image pickup apparatus comprising:
a lens apparatus defined in claim 14; and
a camera apparatus connected to the lens apparatus and including an image pickup element configured to receive light from the lens apparatus.

16. A stop apparatus comprising:
a plurality of stop blades;
a supporting member supporting the plurality of stop blades rotatably about rotating centers thereof; and
a rotating member with cams engaged with drive pins provided on the plurality of stop blades,
the plurality of stop blades including:
a close blade which is rotated by the rotating member in a first direction about a corresponding one of the rotating centers in a case of stopping down an opening of the stop apparatus from a predetermined opening diameter state to a close state; and
a non-close blade which is rotated by the rotating member in a second direction opposite to the first direction in the case of stopping down the opening of the stop apparatus from the predetermined opening diameter state to the close state.

17. The stop apparatus according to claim 16, wherein the close blade and the non-close blade have a same shape.

18. A lens apparatus comprising:
a stop apparatus defined in claim 16.

19. An image pickup apparatus comprising:
a lens apparatus defined in claim 18; and
a camera apparatus connected to the lens apparatus and including an image pickup element configured to receive light from the lens apparatus.

* * * * *